(No Model.)
2 Sheets—Sheet 2.
F. WYNNE.
ELECTRICAL APPARATUS FOR THE PROPULSION OF VEHICLES.
No. 324,447.
Patented Aug. 18, 1885.
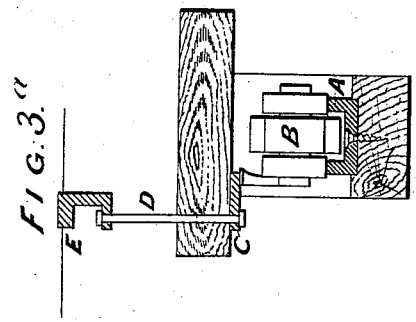
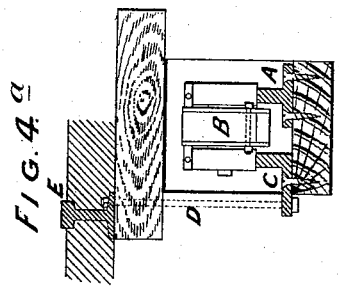
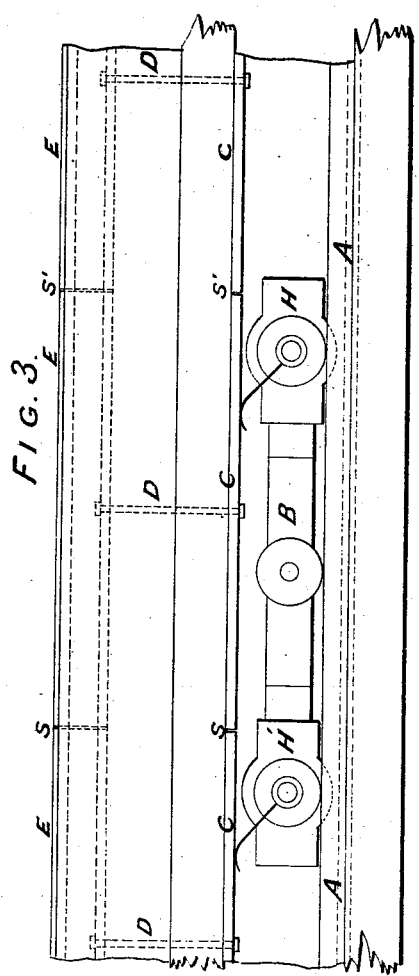
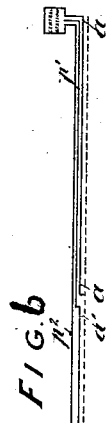
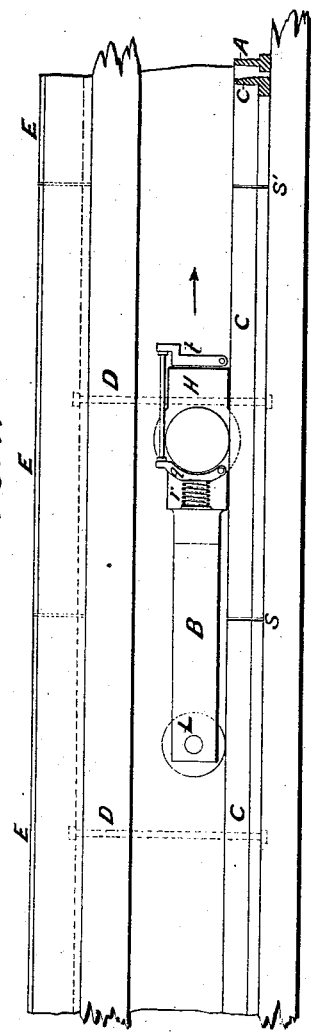
Witnesses.
J. Wetter
J. A. Rae
Inventor.
Frank Wynne

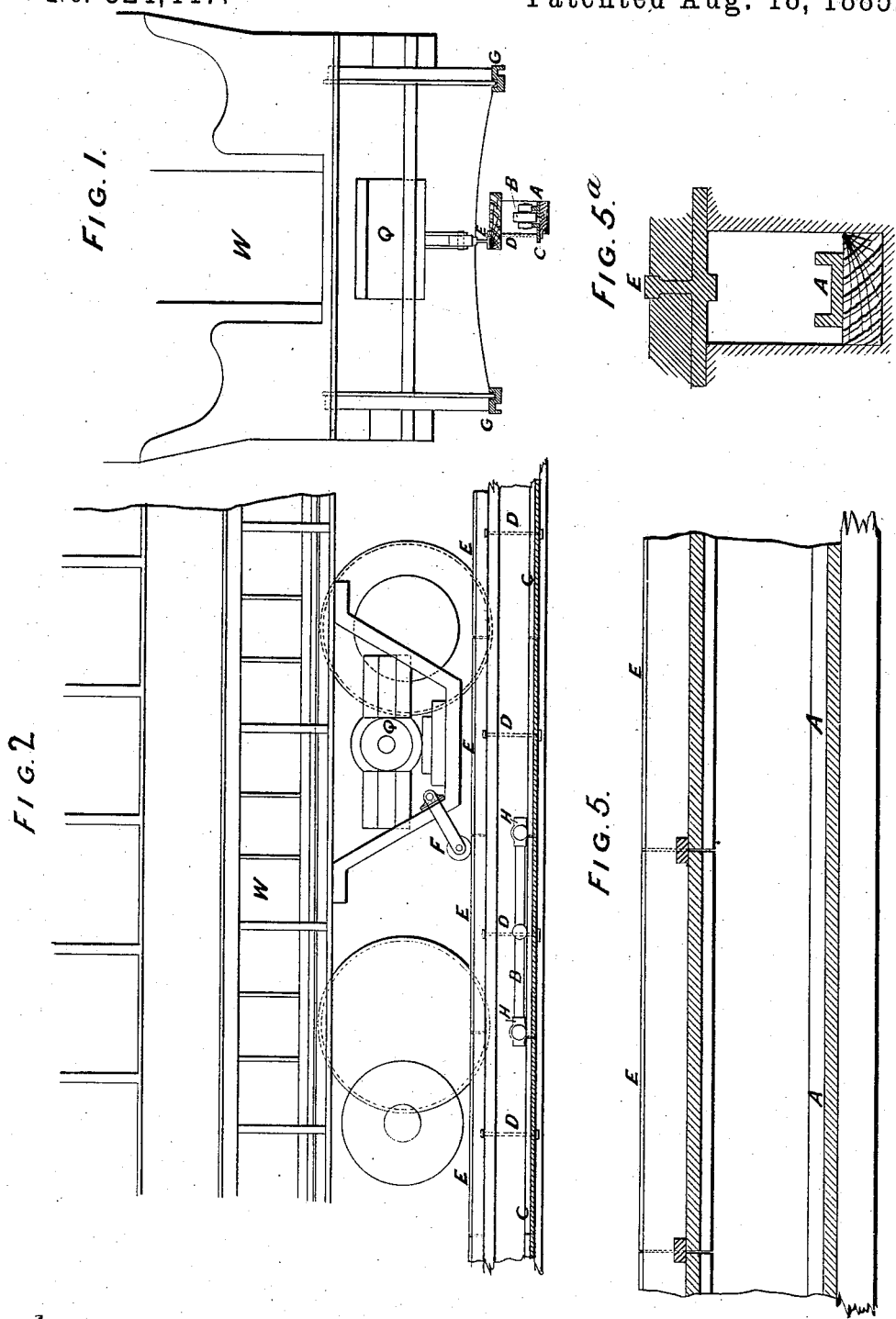

United States Patent Office.

FRANK WYNNE, OF WESTMINSTER, ENGLAND.

ELECTRICAL APPARATUS FOR THE PROPULSION OF VEHICLES.

SPECIFICATION forming part of Letters Patent No. 324,447, dated August 18, 1885.

Application filed April 20, 1885. (No model.) Patented in England April 9, 1883, No. 1,791.

*To all whom it may concern:*

Be it known that I, FRANK WYNNE, of 67 Strand, Westminster, England, have invented a new and useful Electrical Apparatus for the Propulsion of Vehicles, (for which I have obtained a patent in England on April 9, 1883, No. 1,791,) of which the following is a specification.

My invention relates to improvements in apparatus for applying electrical currents, generated by any suitable means from a stationary or other producer or reservoir of electricity, to the propulsion of vehicles on tram and rail ways, the object of my invention being to enable electricity generated by a stationary producer or taken from a reservoir to be used on an open road or highway without interfering with the ordinary traffic, and without the amount of loss or leakage of electricity which occurs under the present system.

In carrying out the invention I supply the electricity from a stationary producer or reservoir to a well-insulated conductor in a covered way, and from this to the tram-car or other vehicle by the use of a small "carrier" or moving contact-maker, itself propelled by the same or part of the same current as the car, in conjunction with non-continuous metallic bars, in such a way that while, in the first place, the electricity is applied by means of the small moving carrier or feeder, (which is a novel and useful part of my invention,) in the next place no part of the metallic connection forming for the time being part of the electrical circuit between the insulated conductor and the tram-car is so exposed on the highway as to be liable to be brought into contact with the ordinary traffic.

The accompanying drawings illustrate the mode of carrying out my invention.

In all the figures like letters of reference refer to like parts.

Figure 1 is a cross-section of a tram-car and the improved apparatus. Fig. 2 is a longitudinal section. Fig. 4$^a$ is a cross-section of a modification of apparatus, and Fig. 4 is a longitudinal section of the same. Fig. 5$^a$ is a cross-section of another modification of part of apparatus, and Fig. 5 is a longitudinal section of the same.

A is an insulated continuous main conductor or conductors of electricity laid in a covered channel connected with any convenient source of electricity, which may extend the full length of the distance over which the car or other vehicle is to be propelled. B is the carrier; C, non-continuous metal bar or bars; D, a metallic conductor electrically connecting C and E; E, non-continuous metallic conductors or road-bars. F is a metallic brush or sliding or rolling contact attached to the tram-cars for electrically connecting the dynamo-electric motor on the tram-car with the bars E. G are the ordinary tram-rails. W is the body of the tram-car. Q is a motor on a tram-car.

In carrying out these improvements I take the insulated conductor or conductors of electricity A, one end of which I connect to one of the poles of a stationary producer or reservoir of electricity, and I lay this under cover parallel to and generally between the rails G, on which the vehicles or vehicle to be propelled (hereinafter called "tram-car") runs; but it may be laid outside the rails G, and in the case of a double line the conductors may be conveniently laid between the two lines. Parallel and near to this conductor A, I place another fairly well insulated conductor, E, which, instead of being continuous, is made up of separate lengths insulated one from another, and, except when otherwise specially arranged, insulated from the main conductor A. These insulated lengths I henceforth call "road-bars," and parts of their surfaces for contact purposes are exposed to the road, as shown. I also provide a small car, herein before and after called a "carrier," which is free to move along the conductor A, and which in its motion along it shall connect electrically said main conductor A consecutively with the road-bars E, one after the other, either directly, as in Figs. 5 and 5$^a$, or by means of the rails C and the metallic conductors D. Sometimes more than one of these road-bars may be connected at one time with the conductor, and I arrange on this carrier B a dynamo-electric motor or motors, hereinafter called "motor," which is or are driven by the electricity conveyed by the conductor A, which thus gives motion to the carrier. I in some cases connect each insulated length of rods electrically with another set of metal bars or bar, C, hereinafter called "rails," laid parallel to the road-bars and connected electrically with the road-bars, in which case the carrier connects the conductor with the road-bars through the intervention of these rails. The electrical circuit is made by the main conductor A, by the carrier B, or part or parts of it, or connected with it; thence by one or more of the rails C, where such are used, and their electrical connection D, to the road-bars; thence by one or more of the sliding or rolling contacts F between the road-bars and the tram-car; thence to and through an electric or dynamo-electric engine carried on the tram-car, which acts as a motor, and thence by a conductor to other suitable parts of the tram-car—such as the wheels of same—or a suitable sliding or rolling contact, and, lastly, by a return-conductor—such as the tramway-rails, or a special return-wire, or a suitable earth-connection—to the stationary dynamo.

The above describes the course of the current where the motor is in circuit; but sometimes I short-circuit the current, so as to leave out the motor, and send the current direct or through suitable resistances from E to the return wire or rails or earth-connection.

In Fig. 4 I show a convenient form of carrier B, carrying a little motor, H, which, when it is in the circuit, is driven forward in the direction of the arrow shown; and to illustrate its action I will suppose that the connection F is on the road-bar E, or has just been raised from making contact with E, and that the carrier has just outrun the car, the latter, say, having been brought to rest. The little motor, as soon as its electrical contact with C has passed S, has ceased to be driven and by friction has been brought to rest. To facilitate its being brought to rest, I sometimes arrange a self-acting brake on it, of which I show a convenient form, $q$ being the brake, which is held in contact with the wheel of the little motor by the spring $r$. When H is in the circuit, I arrange that a convenient electro-magnet shall be excited and attract the armature $t$, thus forcing back the brake $q$ from its contact with the wheel. On restarting the car the driver moves F into contact with E, and sometimes I arrange on the carrier a rear contact, which in this case is a wheel, L, joining C and A, so that if F has been raised from E to stop the car, on making contact again the car starts to move, but the carrier does not start until F has got onto E. I also, when it is desired, connect two motors or sets of motors, Figs. 2 and 3, H H', carried by the carrier, so that they revolve with about equal force in opposite directions when traversed by the same or a similar current, and I separate these opposing motors, or the electric contacts which these two motors or sets of motors severally make with the rails or road-bars, by about the distance of the "length" S S' of a bar, and I arrange that when both motors are traversed by a current the carrier is at rest, or nearly so, and the forward and backward motion of the carrier is determined by having only one motor or set in the circuit of the current. This carrier I term a "reversible carrier," because it can go equally or nearly equally well either way. This carrier is shown in cross-section in Fig. 3ª. I sometimes employ carriers which only move in one direction, or at least move only at the proper speed in one direction, and very slowly in the other. In this case I make the rear motor, H', only of such strength that in coming into circuit it acts as an effective brake on the forward motor, and after bringing it to rest either continues it so or drags it slowly backward. This carrier I term a "drag-carrier."

The rails and the road-bars may sometimes be merged into one and the same metal bar, as shown in Figs. 5 and 5ª, the upper surface of such bar being on the road, and the under surface being exposed to a contact-maker or contact-makers on the carrier. The connection of the road-bars with the return-conductor, whether through the motor or otherwise, may be so arranged as to be never entirely broken, even when, for example, the tram-car is running downhill. When the current does not pass through the motor, it may be "short-circuited," and be made to be short-circuited through suitable electrical resistances. The road-bars I sometimes arrange in one line, sometimes in two or more lines. The rails, similarly, I sometimes lay in one line, sometimes in two or more lines. One set of the ordinary train-rails may be used as road-bars, if they and the axles or other suitable part of the car is properly provided with the means of insulating it, as would be obviously necessary; but I generally find it more convenient and economical to have separate road-bars. I sometimes divide up my length of tramway-line into sections, each section being provided with its own separate main conductor from a dynamo-machine—shown in Fig. 6, where $a$ $a$ $a'$ $a'$ $a^2$ $a^2$ represent, respectively, three separate lengths of conductor connected to the dynamo at a central station, $a$ $a$, directly, and $a'$ $a'$ and $a^2$ $a^2$ by their respective conductors $p'$ $p^2$. It is not always necessary to have the road-bars in equal discontinuous lengths; but when using the reversible carrier or the drag-carrier the length of a road-bar must not materially exceed the distance between the contacts from the carrier to the road-bars or rails.

What I claim is—

1. The apparatus consisting of the conductor A, the non-continuous bar C, metallic conductor D, non-continuous road-bar E, and metallic brush F, in combination with the carrier or contact-maker B, for applying electricity for the propulsion of vehicles on rails, substantially as described, and for the purposes set forth.

2. The movable carrier or contact-maker B and motor H, constructed substantially as herein referred to, and employed in combination with discontinuous bars C, in the manner and for the purposes substantially as herein described.

In testimony whereof I have signed this specification in the presence of two subscribing witnesses.

FRANK WYNNE.

Witnesses:
T. A. RAE,
A. E. MELHUISH.